US009424268B2

(12) United States Patent
Barnett (10) Patent No.: US 9,424,268 B2
(45) Date of Patent: *Aug. 23, 2016

(54) SYSTEM AND METHOD FOR ALIGNING DATA FRAMES IN TIME

(71) Applicant: CA, Inc., Islandia, NY (US)

(72) Inventor: Paul Barnett, Plano, TX (US)

(73) Assignee: CA, Inc., New York, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 14/010,402

(22) Filed: Aug. 26, 2013

(65) Prior Publication Data

US 2013/0346377 A1   Dec. 26, 2013

Related U.S. Application Data

(63) Continuation of application No. 13/199,597, filed on Sep. 2, 2011, now Pat. No. 8,521,684, which is a continuation-in-part of application No. 12/150,694, filed on Apr. 30, 2008, now Pat. No. 8,055,612, which is a continuation-in-part of application No. 10/654,817, filed on Sep. 3, 2003, now abandoned.

(51) Int. Cl.
| | |
|---|---|
| G06F 17/30 | (2006.01) |
| G06F 15/16 | (2006.01) |
| H04L 12/24 | (2006.01) |
| H04L 12/26 | (2006.01) |
| G06F 11/34 | (2006.01) |

(52) U.S. Cl.
CPC ....... *G06F 17/30156* (2013.01); *H04L 41/147* (2013.01); *H04L 43/04* (2013.01); *H04L 43/0864* (2013.01); *G06F 11/3476* (2013.01); *G06F 11/3495* (2013.01); *H04L 43/10* (2013.01); *H04L 43/106* (2013.01); *H04L 43/12* (2013.01)

(58) Field of Classification Search
USPC ............... 707/609, 610, 611, 736, 752, 758; 709/224, 202; 370/389, 242, 241, 347
See application file for complete search history.

(56) References Cited

U.S. PATENT DOCUMENTS

| | | | |
|---|---|---|---|
| 6,347,084 B1 * | 2/2002 | Hulyalkar et al. ............ 370/347 |
| 8,055,612 B2 * | 11/2011 | Barnett ........................ 707/609 |
| 8,521,684 B2 * | 8/2013 | Barnett ........................ 707/609 |
| 2002/0013843 A1 * | 1/2002 | Schweitzer et al. .......... 709/224 |
| 2002/0105911 A1 * | 8/2002 | Pruthi et al. ................. 370/241 |

* cited by examiner

*Primary Examiner* — Hung T Vy
(74) *Attorney, Agent, or Firm* — Baker Botts L.L.P.

(57) ABSTRACT

A method and apparatus for merging data acquired by two or more capture devices from two or more points in a computer system, duplicate frames are analyzed to determine the time difference between the timestamp of a first capture device and a second capture device. The disclosure compares the frames for duplicates. If the duplicate frames are the first set of duplicate frames discovered, then all previous timestamps and all subsequent timestamps from the second capture device are adjusted by the calculated time difference. If duplicate frames are again discovered, the time difference is recalculated and all subsequent frames from the second capture device are adjusted by the calculated time difference. After all the frames have been analyzed and the timestamps adjusted, the frames are merged together and put into chronological order to simulate a single capture of data encompassing all of the points where the data was collected.

18 Claims, 4 Drawing Sheets

SYSTEM AND METHOD FOR ALIGNING DATA FRAMES IN TIME

CROSS REFERENCE TO RELATED APPLICATIONS

This application is a Continuation of U.S. patent application Ser. No. 13/199,597, filed Sep. 2, 2011, which is a Continuation-in-Part of U.S. patent application Ser. No. 12/150,694, filed Apr. 30, 2008, now U.S. Pat. No. 8,055,612, which is a Continuation-in-Part of U.S. patent application Ser. No. 10/654,817, filed Sep. 3, 2003, now abandoned. Each patent application identified above is incorporated here by reference in its entirety to provide continuity of disclosure.

FIELD OF THE DISCLOSURE

This disclosure relates to a method for capturing data from a system of multiple computer networks in order to analyze the networks for performance. The disclosure also relates to a method for automatically merging data acquired by two or more capture devices from two or more points on a system of computer networks wherein the merged data results in an accurate representation of a single capture file for the entire system.

BACKGROUND

Modern computer networks can include hundreds or thousands of computers connected in networks or tiers. These networks can be, in turn, connected together by larger networks such as the Internet so that systems of many tiers are created.

The networks communicate through frames or packets of data arranged to transfer information in various protocols. The protocols can include, for example, TCP/IP or HTTP. Enterprise applications on the networks communicate through messages broken down into frames. Usually it requires many frames to communicate messages between the computers and tiers of the network system.

"Enterprise applications" are programs displayed on the computers to accomplish various tasks. They are characterized by multiple components deployed across multiple network tiers accessed by users across the entire network system. Parts of a program can be distributed among several tiers, with each part located in a different computer in a network. Examples of enterprise applications include Enterprise Resource Planning (ERP), Customer Relationship Management (CRM), Supply Chain Management (SCM), and Online Banking, Brokerage, Insurance and Retailing.

Enterprise applications typically provide a variety of business functions that users may execute. For example, an online stock trading application may provide some of the following business functions: "log in", "display account status", "retrieve stock prospectus", "sell stock", "buy stock", and "log out". When a user executes a business function, a sequence of transactions is performed with each transaction consisting of a source component transmitting a request (via a network message) to a destination component, often on another tier, and perhaps waiting for a reply message. The destination component processes the request and in the processing consumes local (server) resources such as cpu, disk input/output, and memory and may generate subsequent requests (subtransactions) to other components.

The time that elapses between the user executing the business function (submitting his or her request) and the display of the results on the user's workstation is called the end user response time. The end user response time is typically the most critical measure of end user satisfaction with network and application performance. If the response times are too long, end users will be unsatisfied.

In order to maintain and improve performance, application and system managers must monitor the performance of the network system for response times in order to understand the current performance of applications and components, be able to identify and predict current and future performance problems, and evaluate potential solutions to those problems. Typical problems include data "bottlenecks" such as firewalls and routers and system "delays" caused by mechanical access to data by a disk drive.

The most common method to monitor performance of the system is to capture and analyze network data that is transferred across the tiers via frames. For example, to analyze the performance of the system in relation to requests from a work station, the requests and replies are tracked across the system. To track the requests and replies, data frames are captured and arranged in chronological order to determine how the messages between computers are flowing. The message flow often allows a determination of system performance in relation to response times.

Data frames are captured by computers connected to the network which monitors network traffic with "sniffer" programs. The sniffer programs receive and store copies of data frames in one or more files. During storage, the network sniffer adds data to the frame which indicates the time that the frame was received relative to the sniffer. The added data is known as a "time stamp."

Network system topology often makes it impossible to track message flow for an entire network system from a single network sniffer. To track message flow, frames stored by multiple sniffers must be collected and arranged in chronological order. Even so, the interpretation or analysis of the collected frames from the multiple sniffers can be difficult unless merged into a single file.

Merging files from different sniffers is difficult due to the inaccuracy of their clocks. In the prior art, the clocks from each sniffer are unstable and unsynchronized. Typically in capture devices clocks are low priority programs that "flutter" or "jitter". "Flutter" and "jitter" can cause inaccuracy in clock times of up to 10-40 ms per second depending on the clock program and hardware. Therefore, during the data collection period, slight variations in each capture device's clock can occur. Moreover, the clocks on each sniffer are typically independent and unsynchronized. Because the clocks are not synchronized, the times stamps generated by the various sniffers are not synchronized. If the timestamps are off by even a few milliseconds, the chronologically arranged frames from various sniffers will not be in the right order and so will not give an accurate representation of a single capture file for the entire system making analysis extremely difficult.

Traditionally, the steps for merging the data from the sniffers into a single file have been performed manually. A common method to overcome the lack of synchronization is to manually calculate or estimate the difference between duplicate timestamps and apply a single time adjustment to all frames in the final merged file. One problem with the prior art methods for correcting the inaccuracy of timestamps lies in the application of the calculated difference. This manual calculation is performed once and applied to all the timestamps of the collected frames. As a result, inadvertent or unavoidable changes in the relative difference between the timestamps during data collection can go undetected. Other problems include the tendency of the prior art methods to be both error prone and time consuming.

The use of multiple sniffers in order to track message flow from across a network system creates yet another problem. Namely, the same data frame often traverses a single network to which more than one sniffer is attached. Since each network sniffer receives and stores each data frame, the result is duplicate frames stored by various network sniffers. Before analysis, at least one of each of the duplicates must be removed. In the prior art, the duplicates are identified and removed by hand, creating additional errors.

What is needed is a method wherein the merge of collected data is performed automatically, with no manual intervention. The method should provide for an automatic calculation and adjustment of the difference in timestamps and recalculation of the difference as often as possible. The method should also provide a way to recognize and remove duplicate frames from the final merged file.

BRIEF SUMMARY

The present disclosure provides a method for automatically merging data acquired by two or more capture devices in a computer network system, resulting in a single complete capture file.

In the present disclosure, frames of data are collected and stored into capture files by two or more capture devices or "sniffers". A timestamp is added to each frame by each capture device. The capture files are uploaded and the frames are placed in chronological order in a "dictionary" of frames for each capture file. The frames are indexed by frame identifier sets. The frame identifier sets are a group of parameters common to all frames in a particular dictionary. The frame identifier sets are used to merge the dictionaries together into a single final dictionary of frames which, when arranged in chronological order, is a complete capture file which represents network traffic.

In order to merge the dictionaries, the frame identifier sets from each dictionary are compared for duplicates and then combined. If any frame identifier set from the second dictionary of frames is not contained in the identifier sets from the first dictionary of frames, then the frame associated with the frame identifier set from the second dictionary of frames is added to the first dictionary of frames.

When an identifier set from the second dictionary of frames file is the same as a frame identifier set from the first dictionary of frames, the frames associated with these frame identifier sets are considered duplicates. When duplicates are discovered, the difference between the timestamp of the first frame and the second frame is calculated. Then, the duplicate frame from the second dictionary of frames is discarded. If the duplicate frames are the first set of duplicate frames discovered, then the timestamps of the frames in the second dictionary of frames prior in time to the duplicate frames are all adjusted by the calculated time difference. The timestamps of subsequent frames from the second dictionary are adjusted by the calculated time difference.

When duplicate frames are again discovered, the difference between the timestamps is recalculated and the timestamps for all subsequent frames from the second dictionary are again adjusted by the calculated time difference. The merge process is complete when each of the frames from the second dictionary has either been added to the first dictionary or discarded. The merge process results in a modified first dictionary file which contains all non-duplicate frames from both the first and second dictionaries in chronological order.

BRIEF DESCRIPTION OF THE DRAWINGS

A better understanding of the disclosure can be obtained from the following detailed description of one exemplary embodiment as considered in conjunction with the following drawings in which.

DETAILED DESCRIPTION

Figure 1:
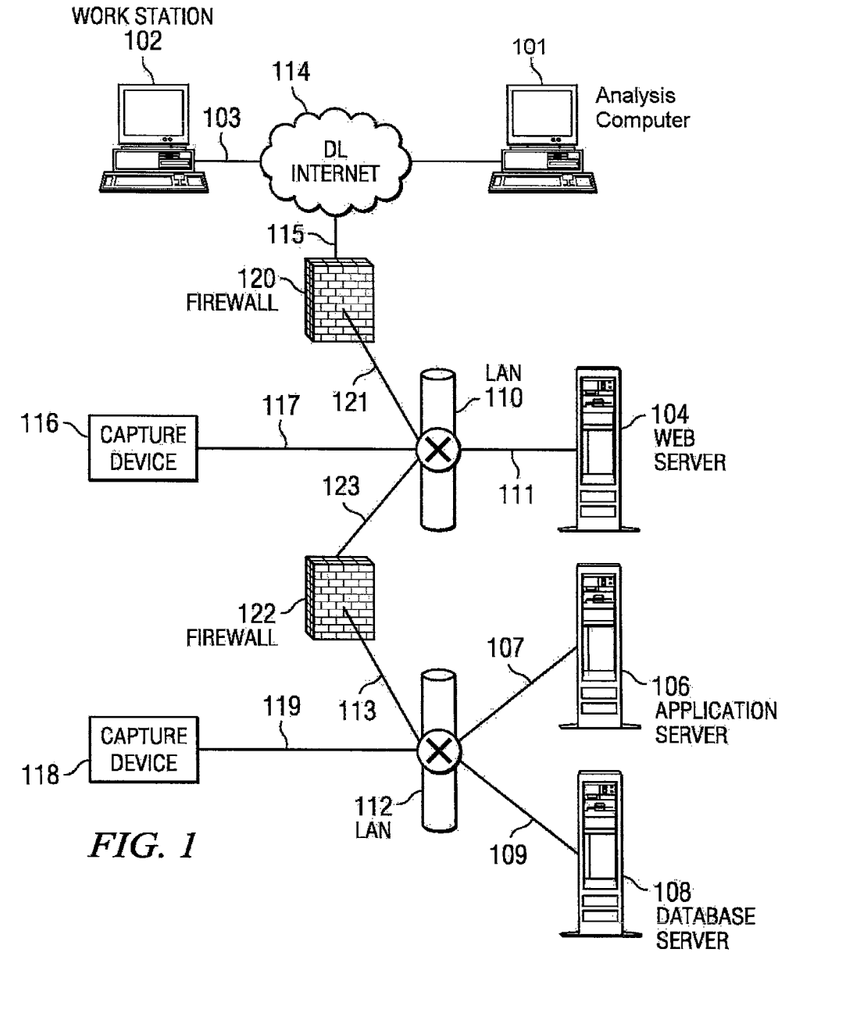
FIG. 1 is a block diagram depicting placement of capture devices in a four tier computer network system according to the present disclosure.

FIG. 1 shows an example of a typical four-tier computer network system running an internet based enterprise application. The first tier comprises work station 102. The second tier comprises web server 104. The third tier comprises application server 106. The fourth tier comprises database server 108. Of course, myriad other configurations and applications are possible and are contemplated by the disclosure.

Work station 102 is a desktop personal computer running a web browser such as Microsoft Explorer or Netscape. Work station 102 is connected to Internet 114 through Ethernet connection 103. Internet 114 is connected to a firewall 120 through Ethernet connection 115.

A firewall is a set of related programs, located at a network gateway server, that protects the resources of a private network from users from other networks. The firewall may work closely with a router program and examine each data frame transmitted to it and forward the data frame toward its destination. The firewall may include or work with a proxy server that makes network requests on behalf of workstation users. Firewall 120 is connected to a LAN 110 through Ethernet connection 121.

LAN 110 is an Ethernet and can function using a number of different protocols. Examples are Transmission Control Protocol (TCP), User Datagram Protocol (UDP), or Internet Control Message Protocol (ICMP). Web server 104 is in communication with LAN 110 via an Ethernet connection 111.

Web server 104 is a computer which provides the presentation logic necessary to display a web page on work station 102. Two commercially available web servers are Apache, and Microsoft's Internet Information Server (IIS).

Capture device 116 and firewall 122 are connected to LAN 110 via Ethernet connections 117 and 123, respectively. The disclosure of course envisions Ethernet connections that are physical or wireless. Firewall 122 is, in turn, connected to LAN 112 via Ethernet connection 113. LAN 110 and LAN 112 need not function on the same protocol. LAN 112 is in turn connected to application server 106, database server 108 and capture device 118 through Ethernet connections 107, 109, and 119, respectively.

Application server 106 is a server program on a computer in a distributed network that provides the "business logic"

for an application program. "Business logic" refers to the routines that perform the data entry, update, query and report processing rather than the presentation logic used to display the data on the screen of work station 102. Application server 106 obtains the data necessary to perform the data processing from database server 108. Database server 108 maintains a persistent store of data available to application server 106.

Capture device 116 is positioned to collect incoming and outgoing data associated with web server 104. It is positioned on LAN 110 because all communications to or from work station 102 from or to web server 104 must traverse LAN 110. In addition, data sent or received from web server 104 to or from application server 106 must also traverse LAN 110. To collect the data, capture device 116 is configured to receive and store all data frames with sources or destinations of web server 104.

Capture device 118 is positioned to collect incoming and outgoing data associated with application server 106. Data sent or received from application server 106 to or from web server 104 must traverses LAN 112. Also data sent or received from application server 106 to or from database server 108 must traverses LAN 112. To collect the data, capture device 118 is configured to receive and store data frames with sources or destinations associated with application server 106.

In an embodiment, capture devices 116 and 118 are known as "sniffers". A sniffer is a program resident on a computer which monitors and analyzes network traffic and captures or collects data being transmitted on a network. Sniffers are often used in conjunction with a router or other similar type device. A router reads every frame of data passed to it to determine the source and intended destination of the frame and then forwards the frame to the correct destination. If the sniffer is being used to collect data associated with either the source or the destination of the frame, then a copy of the frame is created and stored before the frame is forwarded to the correct destination. Sniffer software is commercially available from McAfee, CISCO, and Sniffer Wireless.

Analysis computer 101 is a computer system specifically purposed and programmed to analyze data frames collected from the computer network system by the capture devices. Analysis computer 101 is in communication with the capture devices 116 and 118. Analysis computer 101 includes at least one processor to execute programmed instructions, a memory device for storing the programmed instructions and for storing and manipulating data frames, and storage devices as required to archive and retrieve programs and data.

In order to receive information from web server 104, workstation 102 must send a request for information. In the context of an online stock trading enterprise application, data such as account status is requested by work station 102. Each request and reply are typically made up of many frames of data. The account status request is broken up into frames which travel across Internet 114, through firewall 120, to web server 104 by traversing LAN 110. When frames which make up the account status request traverse LAN 110 with a destination address of web server 104, capture device 116 makes a copy of the frames and stores them in the capture file. In one embodiment, when capture device 116 makes a copy, the entire frame of data is copied and stored, including overhead data.

A data packet or data frame consists of payload data and "overhead data" also known as a header, the payload data containing the data to be transferred across a network, the overhead data containing information such as address information of an intended destination on the network. In another embodiment, only the overhead data is copied and stored into a capture file.

Once the request is received, web server 104 decrypts the status request and forwards the decrypted request that requires business logic to application server 106 traversing LAN 110, firewall 122 and LAN 112. When frames that make up the decrypted status request traverse LAN 110 with a source address of web server 104, capture device 116 makes a copy of the frames and stores that copy in its capture file. Also, when frames associated with the decrypted status request traverses LAN 112 with a destination address of application server 106, capture device 118 makes a copy of the frames and stores it in its capture file. Capture device 116 and 118 now both have an exact copy of the frames associated with the decrypted status request.

Application server 106 receives the decrypted status request and using LAN 112 sends a request to database server 108 for the necessary account data. When frames associated with the request for the necessary account data are sent from application server 106, capture device 118 makes a copy of the frames and stores that copy in the frame file. Database server 108 responds to application server 106 by transmitting the necessary account data to application server 106 via LAN 112. When frames associated with the necessary account data are sent to application server 106, capture device 118 makes a copy of the frames and stores them in its capture file.

Application server 106 performs the data processing and sends the fulfilled request back to web server 104 across LAN 112 through firewall 122 and across LAN 110. When frames associated with the fulfilled request traverse LAN 112 with a source address of application server 106, capture device 118 makes a copy of the frames and stores it in its capture file. Also, when frames associated with the fulfilled request traverse LAN 110 with a destination address of web server 104, capture device 116 makes a copy of the frames and stores it in its capture file. Web server 104 uses presentation logic to prepare the account status data for display on work station 102, encrypts the reply, and sends the reply across LAN 110 and Internet 114 to work station 102 for display. When frames associated with the reply are sent across LAN 110 with a source address of web server 104, capture device 116 makes a copy of the frames and stores it in its capture file.

When analyzing the performance of the system shown in FIG. 1, only data from each of the networks relating to the performance of the system during execution of the application or applications of interest must be collected. In FIG. 1, there are four networks of interest, one for each tier. In practice, points of common usage in the network are chosen for data collection.

In the example of FIG. 1, duplicate frames are created whenever data is sent to or from the web server 104 from or to the application server 106. Since the frames transmitted between the web server 104 and the application server 106 traverse both capture points on the LAN 110 and the LAN 112, those frames are captured by both capture devices 116 and 118. The same frame will appear in both capture files with the only potential difference being the timestamp added by the capture device.

In addition to "natural" duplicates being created due to the flow of data, duplicates may be intentionally "forced". For example, a "ping" from one tier could be sent to a second tier such that the frames would be collected by all the capture devices in the system as described above. The ping command verifies connections to a remote computer or computers by sending out "echo" frames. As the frames traverse the system, the capture devices on the system would collect duplicates as described above and the duplicates would be used to create the time adjustments as described above. In one embodiment of the disclosure, a simple program could send a ping on a regular cycle, such as every second. Because the capture devices in the system would collect duplicate frames associated with the ping, the duplicates can be used to keep the timestamps synchronized. Also, at the start of data collecting, a ping could be sent to force the first frames collected to be duplicates.

When data frames are collected by capture devices 116 and 118 into capture files, the data frames are stored with the protocol control information used to transport the data on the network of interest. The protocols of the various networks may vary, thus creating a different format of data frame stored. As the data frames are received they are "timestamped" with the time of the capture device. Timestamping is known in the art and is performed by the sniffer software installed on the capture device. Analysis computer 101 collects the timestamped data frames from capture devices 116 and 118.

To merge the capture files collected from the capture devices 116 and 118, the capture file from capture device 116 is arbitrarily chosen by analysis computer 101 as a first capture file; the capture file from capture device 118 is then designated as the second capture file. The second capture file is then merged into the first capture file to produce a final capture file which is an accurate representation of all data frames collected from the four tier computer network system.

Figure 4:
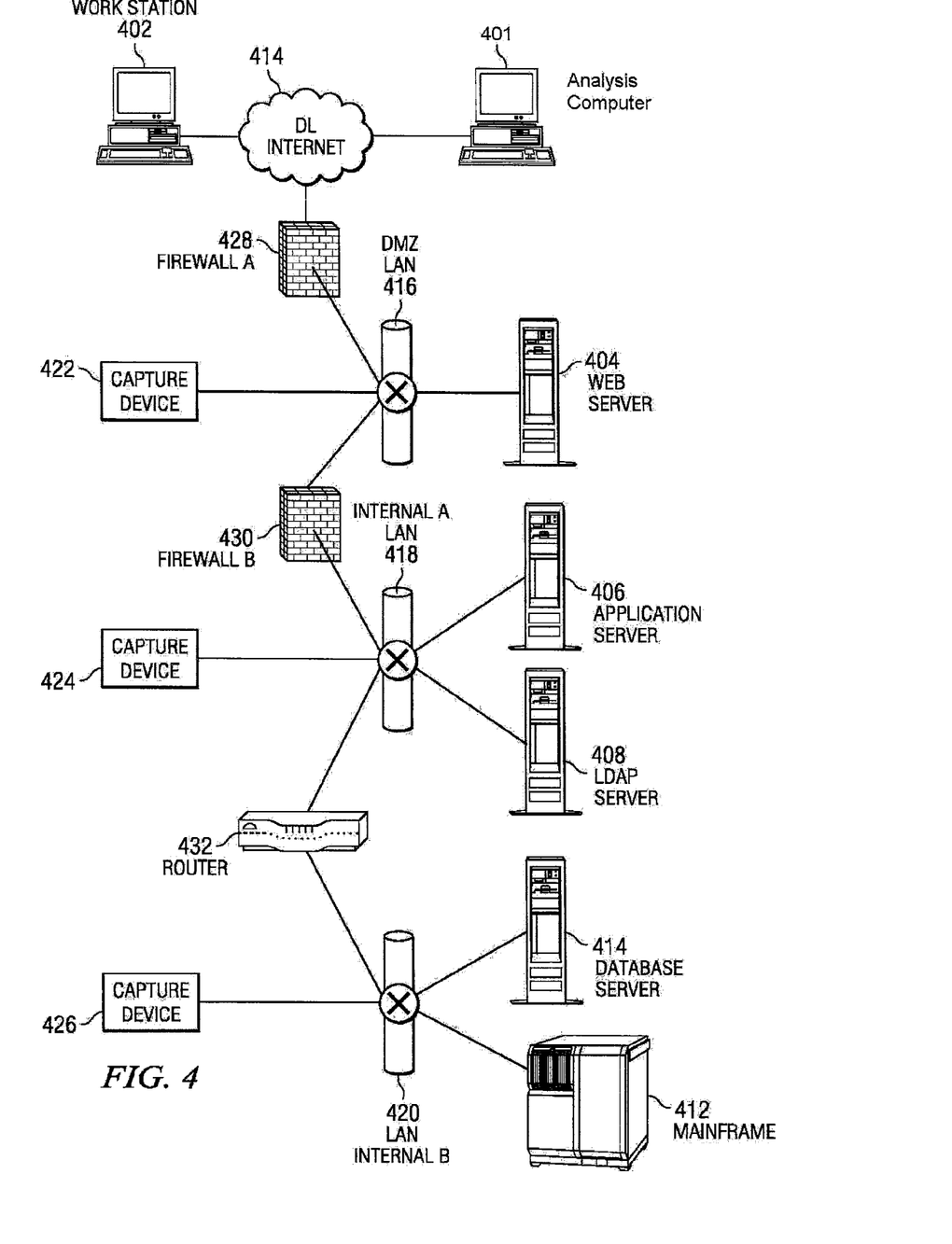
FIG. 4 is a block diagram depicting placement of capture devices in a five tier computer network system according to the present disclosure.

FIG. 4 illustrates a five-tier computer network system where three capture devices are used to collect data. The first tier comprises work station 402. The second tier comprises web server 404. The third tier comprises application server 406. The fourth tier comprises mainframe 412. The fifth tier comprises database server 414.

In a typical request sequence using the system shown in FIG. 4, information is requested at work station 402. The web browser at work station 402 sends the request to web server. The request travels across Internet 414 and through firewall 428 to web server 404 by traversing LAN 416. When the request traverses LAN 416 with a destination address of web server 404, capture device 422 makes a copy of the frames comprising the request and stores that copy in a capture file. Web server 404 decrypts the request and forwards the decrypted request to application server 406 traversing LAN 416, through firewall 430 and traversing Internal A LAN 418. When the decrypted request traverses LAN 416 with a source address of web server 404, capture device 422 makes a copy of the frames comprising the decrypted request and stores that copy in its capture file. Also, when the decrypted request traverses Internal A LAN 418 with a destination address of application server 406, capture device 424 makes a copy of the frames comprising the decrypted request and stores it in its capture file. Capture device 422 and 424 now both have copies of the frame(s) associated with the decrypted request.

Application server 406 receives the decrypted request and using Internal A LAN 418 may request data stored in LDAP server 408. When the request for data traverses Internal A LAN 418 with a source address of application server 406, capture device 424 makes a copy of the frames comprising the request for data and stores it in its capture file. LDAP server 408 transmits the requested data to application server via Internal A LAN 418. When the requested data traverses Internal A LAN 418 with a destination address of application server 406, capture device 424 makes a copy of the frames comprising the requested data and stores it in its capture file.

Also, application server 406 may request data from mainframe 412 across Internal A LAN 418, through router 432 and across Internal B LAN 420. When the request for data traverses Internal A LAN 418 with a source address of application server 406, capture device 424 makes a copy of the frames comprising the request for data and stores it in its capture file. Also, when the request for data traverses Internal B LAN with a destination address of mainframe 412, capture device 426 makes a copy of the frames comprising the request for data and stores it in its capture file. Capture device 424 and 426 now both have copies of the frame(s) associated with the request for data.

After the request for data from application server 406 is received by mainframe 412, mainframe 412 makes one or more requests for the data from database server 414 via Internal B LAN 420. When the request for data traverses Internal B LAN 420 with a source address of mainframe 412, capture device 426 makes a copy of the frames comprising the request for data and stores it in its capture file.

In another embodiment, capture device 426 may be attached to router 432 to collect the incoming and outgoing data associated with mainframe 412. The router sends all the relevant data to a port which is connected to the capture device.

Analysis computer 401 is a computer system specifically purposed and programmed to analyze data frames collected from the computer network system by the capture devices. Analysis computer 401 includes at least one processor to execute programmed instructions, a memory device for storing the programmed instructions and for storing and manipulating data frames, and storage devices as required to archive and retrieve programs and data. Analysis computer 401 is in communication with the capture devices 422, 424 and 426.

Duplicate frames are created whenever data is sent to or from web server 404 from or to application server 406. Since the frames between web server 404 and application server 406 traverse both capture points on LAN 416 and Internal A LAN 418, the frames are captured by both capture devices 422 and 424.

Similarly, frames between application server 406 and mainframe 412 traverse both capture points on Internal A LAN 418 and Internal B LAN 420. The frames between application server 406 and mainframe 412 are captured by capture device 424 and 426.

In an embodiment of the disclosure, after all captured data frames necessary to evaluate the system are collected and timestamped by each capture device, the captured data frames are then downloaded by the analysis computer and stored as a set of capture files, one capture file for each capture device. The analysis computer includes and executes programmed instructions which "preprocess" each capture file into a dictionary of frames and then "merge" the dictionary of frames into a final analysis file. In another embodiment, the preprocessing may be performed on any one of the capture devices. In another embodiment, the merge may be performed on any one of the capture devices.

To merge the capture files collected by capture devices 422, 424, and 426, the capture files from capture devices 422, 424 and 426 are first downloaded by analysis computer 401 after which analysis computer 401 merges the capture files from capture devices 422 and 424 into a first dictionary of frames and moves the data frames from capture device 426 into a second dictionary of frames. Then the first dictionary of frames associated to capture devices 422 and 424 is merged with a second dictionary of frames associated to capture device 426 to produce a final dictionary of frames yielding a final capture file which is an accurate and concise representation of data frames collected from the five tiers.

"Preprocessing" is needed to build a standardized set of identifiers for each frame and to eliminate duplicate frames within each capture file. Typically a single capture device will not collect two of the same frames at different times. However, due to the configuration of some routers, a single capture device will collect two of the same frames when monitoring two or more ports on the router. Also, due to "glitches", electrical, or machine error, it is possible for the same frame to be collected at two different times by a single capture device and therefore for a frame to have two different timestamps. To prevent the same frame from having different timestamps, all duplicate frames within a capture file are discarded during preprocessing except the frame with the earliest timestamp.

Figure 2:
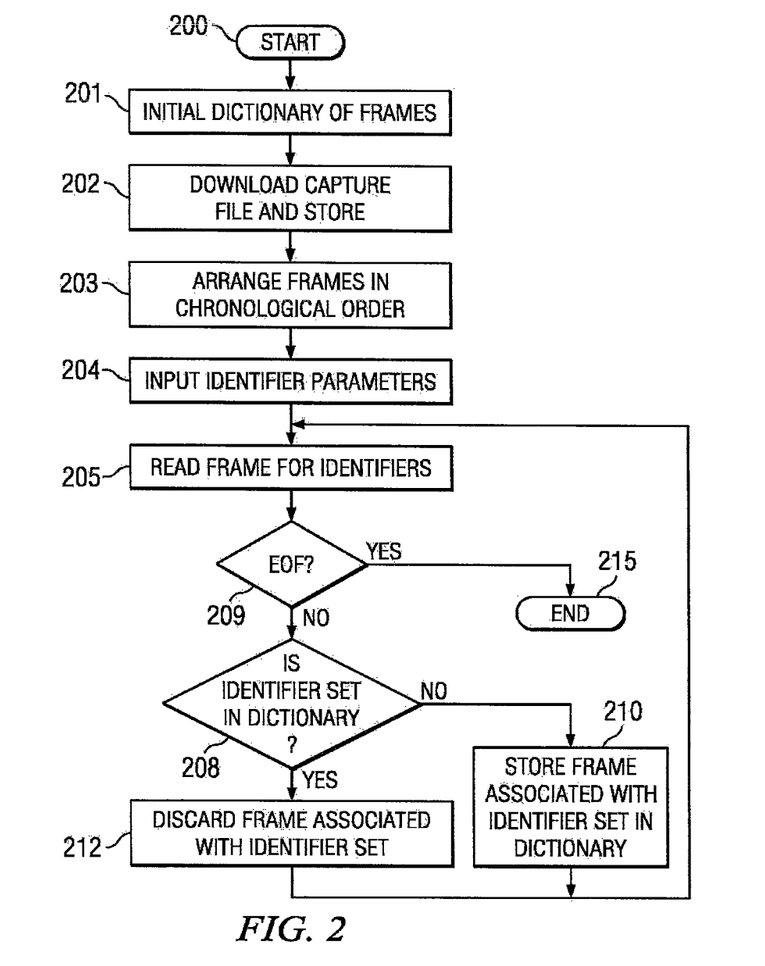
FIG. 2 is a flow chart of the steps undertaken to "preprocess" a capture file for use in the present disclosure.

FIG. 2 is a flow chart of program steps which, when executed by the analysis computer, preprocesses each capture file. The program steps start at Step 200. At Step 201, the analysis computer initializes a dictionary of frames file. At Step 202, the analysis computer downloads each capture file from each capture device. Then, operating on each capture file independently, the analysis computer arranges the frames of the capture file in chronological order at Step 203.

At Step 204 the analysis computer requires input of a list of frame identifier parameters. Examples of identifier parameters vary according to protocol, but can include source address, destination address, protocol identification, sequence number, acknowledgment number, window size, protocol flags (such as ACK and PSH), and length of data payload. Choosing frame identifier parameters is required in order to standardize frame information from the different protocols used by different networks in order to analyze message flow and timing. Ideally, the choice includes a minimum number of parameters which are common to and uniquely identify the frames generated by different protocols. In an embodiment, the minimum number of parameters includes source address, destination address, sequence and arrangement number. For each frame this set is referred to as the identifier set.

At Step 205, each frame of the capture file is read to determine the frame identifier set. At Step 209, the analysis computer determines if the end of file has been reached. If so, the program ends at Step 215. If not at the end of file, the analysis computer proceeds to Step 208.

At Step 208, a frame identifier set for the next frame in the capture file is compared to the frame identifier sets for each frame included in the dictionary of frames. Initially, the dictionary of frames is empty. If a match is found, then the program proceeds to Step 212 and discards the frame in the capture file which is associated with that frame identifier set. The program then returns to Step 205. If a match is not found, then at Step 210 the frame associated with that frame identifier set is stored in the dictionary of frames associated with the specific capture device being analyzed. The stored frame is indexed by the frame identifier set.

The steps shown in FIG. 2 are repeated for each capture file from each capture device resulting in a pre-processed dictionary of frames in chronological order, with all duplicate frames deleted for each capture device used in the computer network system.

After each capture file has been "preprocessed" into a separate dictionary of frames, the dictionaries of frames are "merged" into a single dictionary. The first two dictionary of frames are merged together, then all subsequent dictionaries are merged one at a time until all of the dictionaries are merged into a single final dictionary.

Figure 3:
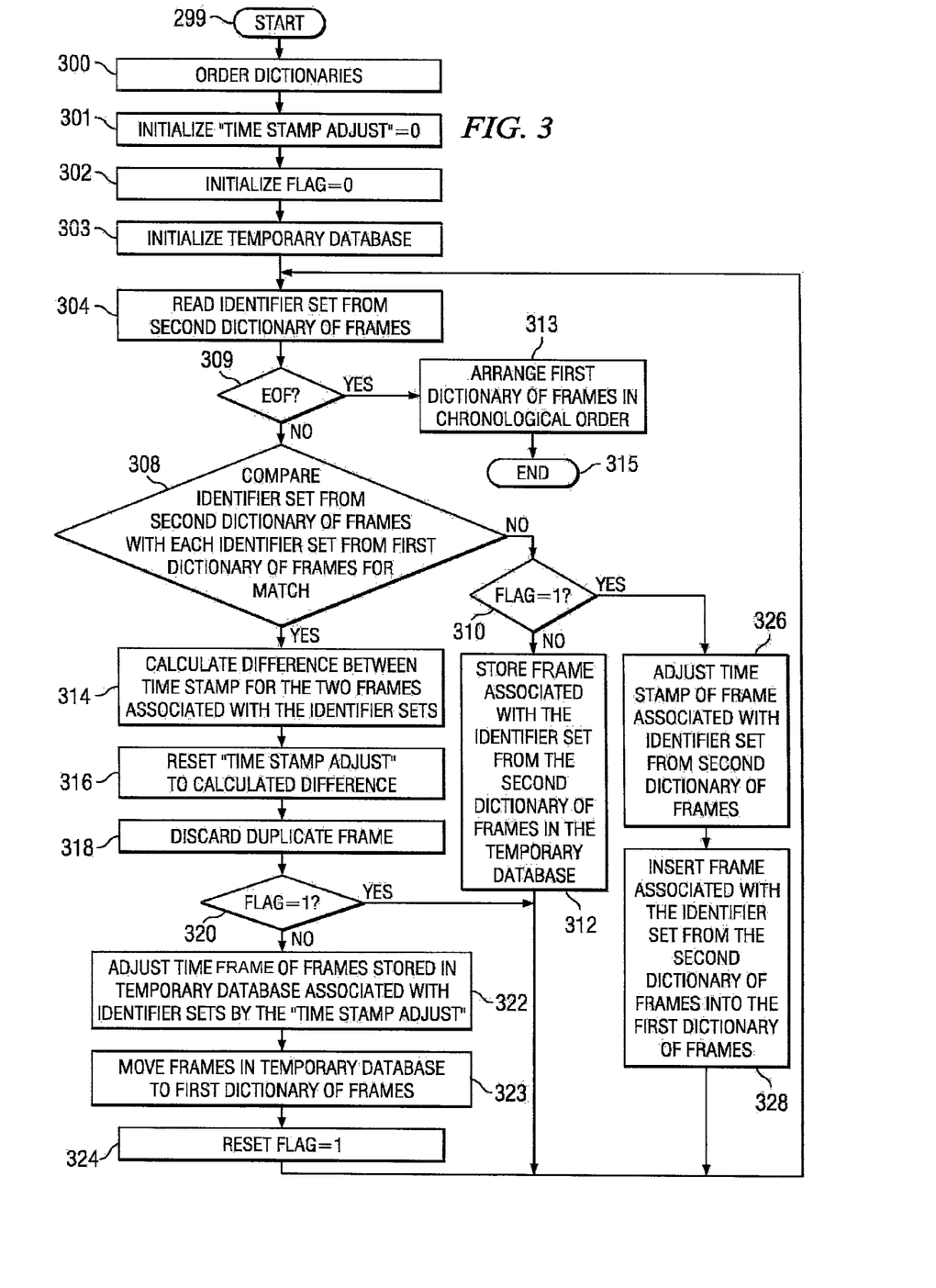
FIG. 3 is a flow chart of the steps undertaken to "merge" two or more capture files for use in the present disclosure.

FIG. 3 is a flow chart depicting a method of how the preprocessed dictionaries are merged. The method, which is implemented as a set of program steps stored and executed on the analysis computer, begins at Step 299. At Step 300 the dictionaries are arbitrarily ordered first through last. At Step 301, a "flag" variable is initialized to designate whether or not duplicate frames have been identified. If the flag is equal to 0, then duplicate frames have not been identified. If the flag is equal to 1, then duplicate frames have been identified. At Step 302, a "timestamp adjust variable" is initialized. At Step 303, a temporary database is initialized.

At Step 304, the method reads a frame identifier set from the second dictionary. At Step 309, the program determines if the end of the file for the second dictionary has been reached. If so, at Step 313 the method generates a final dictionary by arranging the frames contained in the first dictionary in chronological order according to timestamp and ends at Step 315. If not at the end of file, the program proceeds to Step 308. At Step 308, the method compares the frame identifier set from the second dictionary with each frame identifier set from the first dictionary. If a match is found, the program proceeds to Step 314 where it calculates the difference between the time stamps of the frames from the first and second dictionaries associated with the matching frame identifier sets.

At Step 316, the value of the calculated timestamp difference is stored as "timestamp adjustment". The frame associated with the frame identifier set from the second dictionary is then discarded at Step 318. At Step 320, the flag is read to determine if the duplicate frames are the first set of duplicate frames discovered. At Step 322, if the frames are the first set of duplicate frames discovered, then the timestamp for all the frames in the temporary database of frames is adjusted by the value of the "timestamp adjustment" variable. In an alternate embodiment, a temporary database of frames is not created and all the frames from the second dictionary of frames with timestamps earlier than the first set of duplicate frames discovered are adjusted by the value of the "timestamp adjustment". At Step 323, the frames in the temporary database are inserted into the first dictionary. The flag is set to 1 at Step 324 and the next frame identifier set from the second dictionary is read at Step 304.

If at Step 320, the flag is equal to 1, then the program returns to Step 304.

At Step 308, if the frame identifier set from the second dictionary is not a match for any frame identifier sets from the first dictionary of frames, then Step 310 checks the value of the flag. If the value of the flag is 1, then, at Step 326, the timestamp of the frame associated with the identifier set from the second dictionary is adjusted by the value of the variable timestamp adjustment. Moving to Step 328, the frame associated with the frame identifier set from the second dictionary is inserted into the first dictionary and the method returns to Step 304.

If at Step 310 the value of the flag is not equal to 1, then the frame associated with the frame identifier set from the second dictionary is stored in the temporary database at Step 312. The program then returns to Step 304.

After the merge portion of the method is completed, all of the capture files from each of the capture devices of the computer network system have been merged into the first dictionary of frames from the first capture device and all duplicate frames have been eliminated. The timestamps of the various capture devices have been synchronized according to the disclosed algorithm. Moreover, both of these functions have been accomplished automatically without the introduction of human error or approximation.

Although the disclosure has been described with reference to one or more embodiments, this description is not to be construed in a limiting sense. There is modification of the disclosed embodiments, as well as alternative embodiments of this disclosure, which will be apparent to persons of ordinary skill in the art, and the disclosure shall be viewed as limited only by reference to the following claims.

The invention claimed is:

1. A system, comprising:
an analysis computer, in communication with first and second capture devices, programmed to:
successively compare a selected data frame from a second set of data frames associated with a second capture device with each data frame from a first set of data frames associated with a first capture device;
identify a first pair of duplicate data frames in the first set of data frames and the second set of data frames, and calculate a time stamp difference between the first pair of duplicate data frames; and,
remove one duplicate data frame of the first pair of duplicate data frames from the second set of data frames and adjust a timestamp of each data frame remaining in the second set of data frames by the timestamp difference.

2. The apparatus of claim 1, wherein the analysis computer is further programmed to:
determine a first frame identifier set for a first data frame in the first set of data frames;
determine a second frame identifier set for the selected data frame from the second set of data frames;
compare the first frame identifier set and the second frame identifier set for equality;
if there is equality, then identity that the first data frame and the selected data frame as the first pair of duplicate frames; and
if there is not equality, then determine the first data frame and the selected data frame are not duplicate frames.

3. The apparatus of claim 1, wherein the analysis computer is further programmed to:
identify a first set of duplicate frames from the first set of data frames except a first data frame;
remove the first set of duplicate frames from the first set of data frames except a first data frame;
locate a second set of duplicate frames sharing a second frame identifier set in the second set of data frames; and,
remove the second set of duplicate frames from the second capture file except a second data frame.

4. A method for merging frames collected by a first set of capture devices and a second capture device, connected to a computer network, into a comprehensive capture file, the method comprising:
receiving a first set of frames, having a first set of time-stamps, from the first set of capture devices;
receiving a second set of frames, having a second set of time-stamps, from the second capture device;
successively assigning each frame of the second set of frames to be a chosen frame having a chose frame time-stamp;
successively comparing the chosen frame to each frame of the first set of frames;
if the chosen frame matches at least one frame of the first set of frames having a first timestamp, then determining a numerical difference between the chosen frame timestamp and the first timestamp, deleting the chosen frame from the second set of frames, and altering each timestamp of the second set of timestamps by the numerical difference; and,
if the chosen frame does not match at least one frame of the first set of frames, then appending the chosen frame to the first set of frames.

5. The method of claim 4 further comprising:
determining a first frame identifier set for a first frame in the first set of frames;
determining a second frame identifier set for a second frame in the second set of frames; and,
comparing the first frame identifier set and the second frame identifier set for equality.

6. The method of claim 4 wherein each frame of the first set of frames further includes a set of overhead data and a set of non-overhead data and further comprising:
removing the set of non-overhead data.

7. The method of claim 4 further comprising:
arranging each frame in the first set of frames in chronological order;
determining a set of duplicate frames in the first set of frames;
determining a first duplicate frame having an earliest timestamp in the set of duplicate frames; and,
discarding the set of duplicate frames except the first duplicate frame.

8. The method of claim 7 further comprising:
arranging each frame in the first set of frames in chronological order;
determining a set of duplicate frames in the first set of frames;
determining a first duplicate frame having an earliest timestamp in the set of duplicate frames; and,
discarding the set of duplicate frames except the first duplicate frame.

9. The method of claim 4 further comprising:
sending a first ping to a first capture device;
sending a second ping to the second capture device; and,
sending an echo frame to the first capture device and the second capture device.

10. A system comprising:
an analysis computer in communication with first and second capture devices, programmed to:
determine a first set of frame identifiers and a first set of timestamps for a first set of data frames received from the first capture device;
determine a second set of frame identifiers and a second set of timestamps for a second set of data frames received from the second capture device;
find a first set of duplicate frame identifiers in the first set of frame identifiers;
remove a first set of duplicate frames from the first set of frame identifiers based on the first set of duplicate frame identifiers;
find a second set of duplicate frame identifiers in the second set of frame identifiers;
remove a second set of duplicate frames from the second set of frame identifiers based on the second set of duplicate frame identifiers;
find a set of matching frame identifiers between the first set of frame identifiers and the second set of frame identifiers;
select a data frame having a measured timestamp from the second set of data frames;

determine a timestamp difference for the data frame based on the set of matching frame identifiers, the measured timestamp and the first set of timestamps;

adjust the second set of timestamps for the second set of data frames by the timestamp difference;

identify an unmatched set of data frames in the second set of data frames based on the set of matching frame identifiers; and, include the first set of data frames and unmatched set of data frames in the comprehensive capture file.

11. The computer system of claim 10 wherein the analysis computer, is further programmed to:

chronologically order the first set of data frames according to the first set of timestamps; and, chronologically order the second set of data frames according to the second set of timestamps.

12. The computer system of claim 10 wherein the first set of data frames comprises a set of overhead data bytes for each data frame and wherein the analysis computer is further programmed to exclude a set of non-overhead data bytes for each data frame.

13. The computer system of claim 10 wherein the analysis computer, is further programmed to transmit a set of echo frames to the first capture device and the second capture device.

14. The computer system of claim 10 wherein the analysis computer is further programmed to:

locate a set of multiple data frames, in the first set of data frames, having a single frame identifier; and delete all but one data frame in the set of multiple data frames.

15. The computer system of claim 14 wherein the analysis computer is further programmed to select the one data frame based on a timestamp of the one data frame.

16. The computer system of claim 10 wherein the analysis computer is further programmed to:

locate multiple data frames in the second set of data frames with a single frame identifier; and, delete all but one data frame in the multiple data frames.

17. The computer system of claim 16 wherein the analysis computer is further programmed to select the one data frame based on a timestamp of the one data frame.

18. An apparatus for analyzing the performance of a computer system;

the apparatus comprising:

an analysis computer, having a memory and connected to the computer system, programmed to:

store a set of data frames in the memory;

store a first time stamp difference in the memory;

receive a candidate data frame from at least one capture device, of a set of capture devices connected to the computer system;

compare the candidate data frame to each data frame in the set of data frames to locate a duplicate data frame;

if the duplicate data frame is located in the set of data frames, then determine a second time stamp difference between the candidate data frame and the duplicate data frame, and adjust a residual time stamp difference of a subsequent set of data frames received from the at least one capture device by the second time stamp difference;

if the duplicate data frame is not located in the set of data frames, then adjust the time stamp of the candidate data frame by the first time stamp difference and insert the candidate data frame in the set of data frames.

* * * * *